United States Patent [19]
Aldissi

[11] Patent Number: 5,206,459
[45] Date of Patent: Apr. 27, 1993

[54] CONDUCTIVE POLYMERIC SHIELDING MATERIALS AND ARTICLES FABRICATED THEREFROM

[75] Inventor: Mahmoud Aldissi, Colchester, Vt.

[73] Assignee: Champlain Cable Corporation, Winooski, Vt.

[21] Appl. No.: 748,146

[22] Filed: Aug. 21, 1991

[51] Int. Cl.$^5$ ............................................ H01B 11/18
[52] U.S. Cl. .................................. 174/36; 174/34; 174/106 SC
[58] Field of Search ............... 174/36, 34, 102 SC, 174/106 SC; 252/513

[56] References Cited

U.S. PATENT DOCUMENTS

| | | | |
|---|---|---|---|
| 3,191,132 | 6/1965 | Mayer | 174/36 |
| 4,347,407 | 8/1982 | Martin | 174/36 X |
| 4,371,742 | 1/1983 | Manly | 174/36 |
| 4,486,721 | 12/1984 | Cornelius et al. | 174/36 X |
| 4,506,235 | 3/1985 | Mayer | 174/36 X |
| 4,510,468 | 4/1985 | Mayer | 174/36 |
| 4,816,614 | 3/1989 | Baigrie et al. | 174/36 |
| 4,920,233 | 4/1990 | Kincaid | 174/36 |
| 4,970,488 | 11/1990 | Horiike et al. | 174/102 SC |
| 5,025,115 | 6/1991 | Sayegh et al. | 174/36 X |

*Primary Examiner*—Morris H. Nimmo
*Attorney, Agent, or Firm*—Salzman & Levy

[57] ABSTRACT

The present invention features a new shield material useful in the fabrication of shielded wire or cable articles. The conductive core of the wire and cable is layered with a shielding wrapping tape, foil or film. A shielding insulation compound can also be extruded over the conductive wire or cable core. Wire and cable articles containing the new shield material have an extended interference frequency attenuation range resulting from the improved shield layer. The shield material contains shaped ferrite particles dispersed within a polymeric binder, such as a fluorocarbon polymer. The shaped particles are generally spherical.

11 Claims, 9 Drawing Sheets

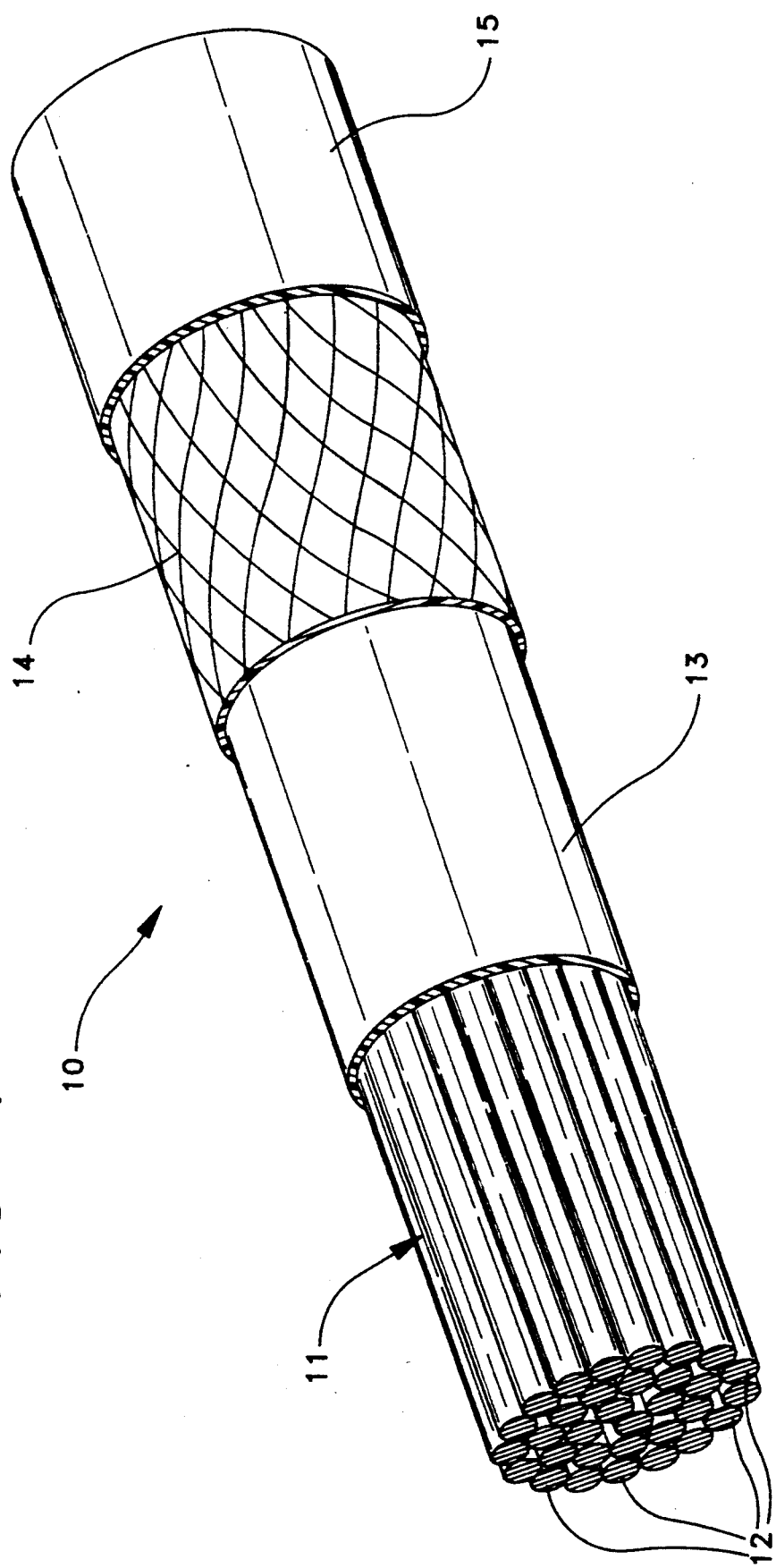

CONDUCTIVE POLYMERIC SHIELDING MATERIALS AND ARTICLES FABRICATED THEREFROM

FIELD OF THE INVENTION

The invention relates to shielding materials used in the manufacture of wire and cable, and more particularly to shaped, ferrite particles that are integrated into, and dispersed within, a polymeric matrix which is used as a shield layer in multi-layered wire and cable construction.

BACKGROUND OF THE INVENTION

In recent times, ferrite particles have been dispersed within polymeric matrices to provide conductive materials with good electrical properties. The present invention reflects the discovery that these types of materials can be used in shielding applications.

When ferrites are mixed with certain polymers, they provide easily extrudable compounds most suitable for wire and cable fabrication. Such compounds can be directly extruded over bare or insulated wire to form a wire and cable article that attenuates (filters) high frequency interferences.

This invention features wire and cable insulation that can be fabricated for attenuating interference signals of both lower and higher frequencies, than were heretofore possible. The extended frequency range encompasses both RF and electromagnetic signals. The insulation layer of the invention provides both RFI and EMI frequency attenuation in a single layer, reducing the need for metal braiding.

Wire providing microwave/radar frequency attenuation is referred to in the wire and cable trade as "filter line." Some of these cables are referenced by U.S. Mil Spec. No. Mil-C-85485. The measurement of the attenuation (insertion loss) upon a given wire's performance relates to the effect of filter line on interference signals conducted down the wire.

Properly shielded filter line provides protection against radiated EMI. Noise currents and voltages are induced on the conductors of the cables when a radiated field causes interference. Filter line can attenuate such noise when it is shielded by metallic braid or other forms of conventional shield layering.

The impedance characteristics of the particles vary depending upon the supplier, fabrication conditions, and composition. The shielding effect can be measured by transfer impedance techniques.

The current invention contemplates a wire or cable construction employing a single layer consisting of shaped, ferrite particles dispersed in a polymeric matrix, such as Viton, a fluorinated elastomeric polymer manufactured by DuPont Corporation. The ferrite particles are manufactured by various industries such as Steward Mfg. Co. of Tennessee, and Fair-Rite Products Corp. of New York.

The present invention seeks to fabricate wire and cable articles that provide protection against both aforementioned effects (i.e., attenuation of signals conducted down the wire, and radiated EMI) utilizing only a single layer of material.

The invention reflects the discovery that the shape of the ferrite particles has a great effect upon the attenuation characteristics of the polymeric matrix. Generally speaking, the invention has determined that spherically shaped ferrite particles provide greater attenuating effectiveness than do randomly shaped particles.

Shaped ferrite particles, according to the present invention, are hereinafter defined as ferrite or magnetite particles that are manufactured with rounded surfaces, generally provided by geometrically round shapes, such as spherically or cylindrically shaped particles. Such shaped particles eschew the sharp, random edges inherent in randomly shaped particles. Such shaping provides for better shielding, since energy dissipation has been found to be enhanced when the ferrite particles are shaped with rounded geometries. Particles not geometrically shaped shall hereinafter be referred to as irregularly shaped, randomly shaped, differently shaped or irregularly shaped flaked particles, as a means of distinguishing them from the particles of this invention.

High frequency signals conducted down this wire are partially absorbed by the shaped particle shield layer. The electromagnetic waves penetrate through this shield layer up to the ferrite particles, and are then dissipated by lattice vibration or photon emission. Thus, a filter line cable can be provided which has a polymeric shield layer that is much lighter and more flexible than a metal braid shield layer.

The advantages of such construction include a savings in cost and weight, and an improved flexibility compared to metal shielded wire utilizing tapes, braids, foils, etc. Weight saving is particularly important in view of the stringent requirements for present day, light-weight space and aeronautical wire and cable.

SUMMARY OF THE INVENTION

In accordance with the present invention, there is provided a new shield material useful in the fabrication of shielded wire or cable articles. The conductive core of the wire and cable is layered with a shielding wrapping tape, foil or film. A shielding insulation compound can also be extruded over the conductive wire or cable core. Wire and cable articles containing the new shield material have an extended interference frequency attenuation range resulting from the improved shield layer. The shield material contains shaped ferrite particles dispersed within a polymeric binder, such as a fluorocarbon polymer. The shaped ferrite particles are generally spherical; this shape having been determined to provide the best attenuation. Other shaped particles such as randomly shaped particles in combination with the spherically shaped ferrites can be dispersed within the polymer matrix, and may also be part of the blended formulation. The shielded wire or cable attenuates EMI interferences in a wider frequency range.

The mixture of particulates and polymer binder can be prepared by state-of-the-art compounding techniques and then molded or extruded into various shapes or forms.

DISCUSSION OF RELATED ART

It is known to provide a polymeric shielding layer in the fabrication of high frequency attenuating wire and cable. The polymeric shielding layer matrix of this type of wire and cable is filled with ferrite particles that attenuate EMI. Such a shielding layer is disclosed in U.S. Pat. No. 4,486,721, issued to Cornelius et al on Dec. 4, 1984.

The present invention differs from the above-mentioned invention, in that the ferrite particles of the polymeric matrix shield layer have been shaped to increase the attenuating frequency range of the wire and cable article.

BRIEF DESCRIPTION OF THE DRAWINGS

A complete understanding of the present invention may be obtained by reference to the accompanying drawing, considered in conjunction with the subsequent detailed description, in which:

FIG. 1 illustrates a partially cut-away, perspective view of a typical shielded cable article fabricated in accordance with the shield materials of the present invention.

FIG. 1a illustrates a partially cut-away, perspective view of the cable shown in FIG. 1 having two core members.

DESCRIPTION OF THE PREFERRED EMBODIMENT

Figure 2A:
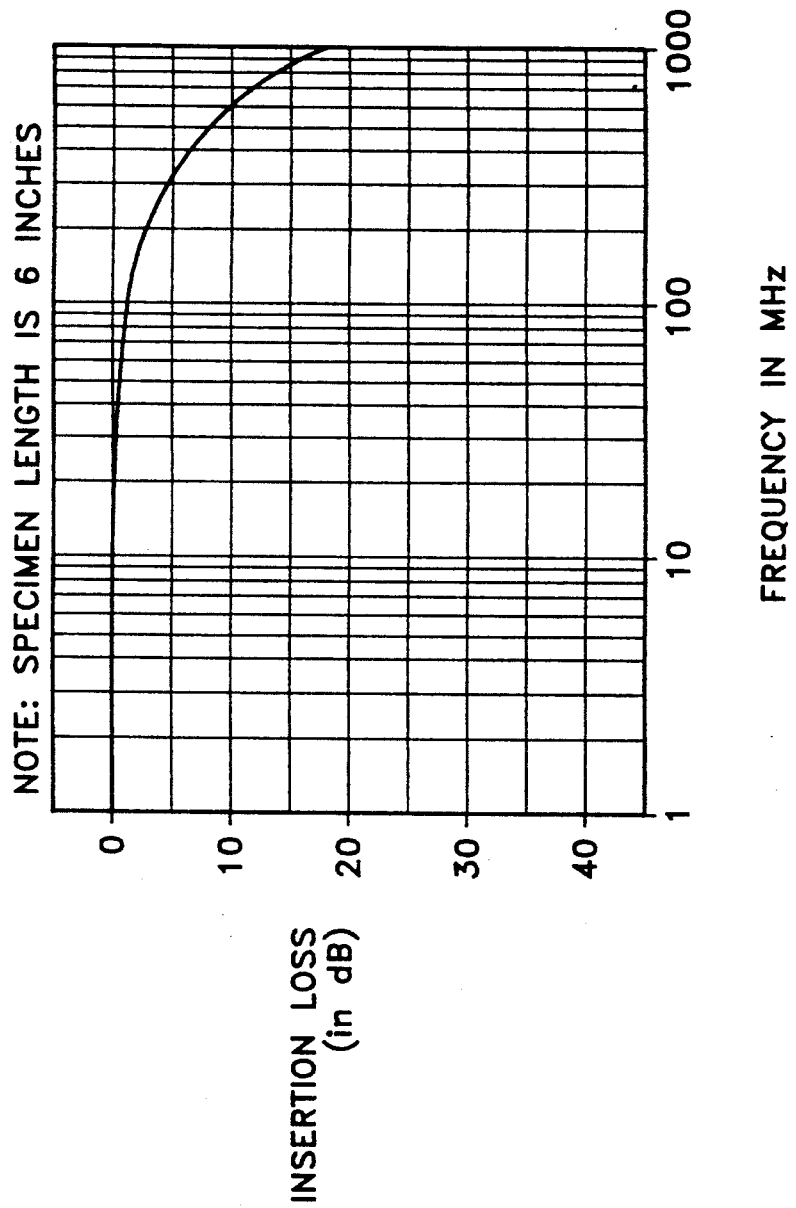
FIGS. 2a and 2b depicts graphs of attenuation test results utilizing a non-shaped ferrite particle shield layer in the shielded cable fabricated in accordance with the construction shown in FIG. 1.

Generally speaking, the invention features new types of shielding materials particularly useful in the fabrication of wire and cable articles. The shielding materials are a blend of shaped ferrite particles and a binding polymer or combination of binding polymers. The shielding materials can be layered, extruded, coated, wrapped, etc., over a conductor or conductive wire core. The shaped ferrite particles are generally spherical, and can also be blended with randomly shaped particles.

Now referring to FIG. 1, a cable 10 is shown in partial cut-away perspective view. The cable 10 comprises a conductive core member 11, which contains one or more electrically conductive wires 12, which can be straight bundled or twisted together. The conductive wires 12 may be bare or each may have a layer of insulation (not shown). The entire conductive core 11 may also be covered by a primary insulation layer 13 of PVDF (Kynar), or other fluorinated polymers.

Shielding material 14 is layered over the primary insulation layer 13. The shielding layer 14 comprises a blend of MnZn ferrite particles in a polymer matrix. The blend of materials in accordance with the invention provides shielding in an extended range heretofore unachievable by a single layer of shielding, resulting from the shaping of the particles in whole or in part. Spherically shaped ferrite particles have been found to provide attenuation at extended frequency ranges. Spherically shaped ferrite particles can also be blended with non-shaped, or irregularly shaped ferrite particles. The polymer matrix comprises approximately between 10 to 90% by weight of the total blend of materials.

Over the shielding layer 14 is a jacket cover 15, which can be applied as a wrap of tape. The jacket 15 can comprise a layer of ETFE, cross-linked ETFE, FEP, or other polymers.

The shielding layer 14 provides shielding for EMI interferences. The ferrite particles can be bound in a polymer such as Viton, a fluorinated, rubbery polymer manufactured by DuPont Corporation, or in other polymers. The fabrication of the wire and cable article of this invention is described in the illustrative examples shown below. The polymer matrix is selected from a group of polymer materials consisting of: fluorocarbons, acrylates, fluorinated elastomers, fluorinated copolymers, and combinations thereof.

Referring to FIG. 1a, an alternate embodiment of cable 10 is shown. The cable 10' depicts a cable article having two core members 11a and 11b, respectively. The core members 11a and 11b are covered with an insulation layer 13 and then respectively overlaid with a shield layer 14 and a jacket layer 15, as previously described for the embodiment of FIG. 1.

EXAMPLE I

To a conductive core 11 comprising 19×34 strands of tin/copper wire, 22 AWG, having an O.D.=0.024", a layer 13 of primary insulation was applied. The primary insulation consisted of irradiated, cross-linked PVDF (Kynar) of 0.035" O.D., over which was applied a shielding layer 14 comprising a blended material having the following formulation by weight: Viton 13%, poly(ethylene-co-methyl methacrylate) 2%, TAIC cross-linking agent 3%, and irregular, non-shaped MnZn ferrite (ferric oxide, $Fe_3O_4$) 82% having an average particle size of between 20 to 30 microns. The shielding layer 14 was irradiated, cross-linked and extruded over layer 13, and had an O.D. in a range from 0.042" to about 0.045", with a wall thickness of approximately 5 mils. A jacket 15 was extruded over the shielding layer 14, and comprised cross-linked ETFE layer having an O.D. of approximately between 0.052" to 0.054".

Figure 2B:
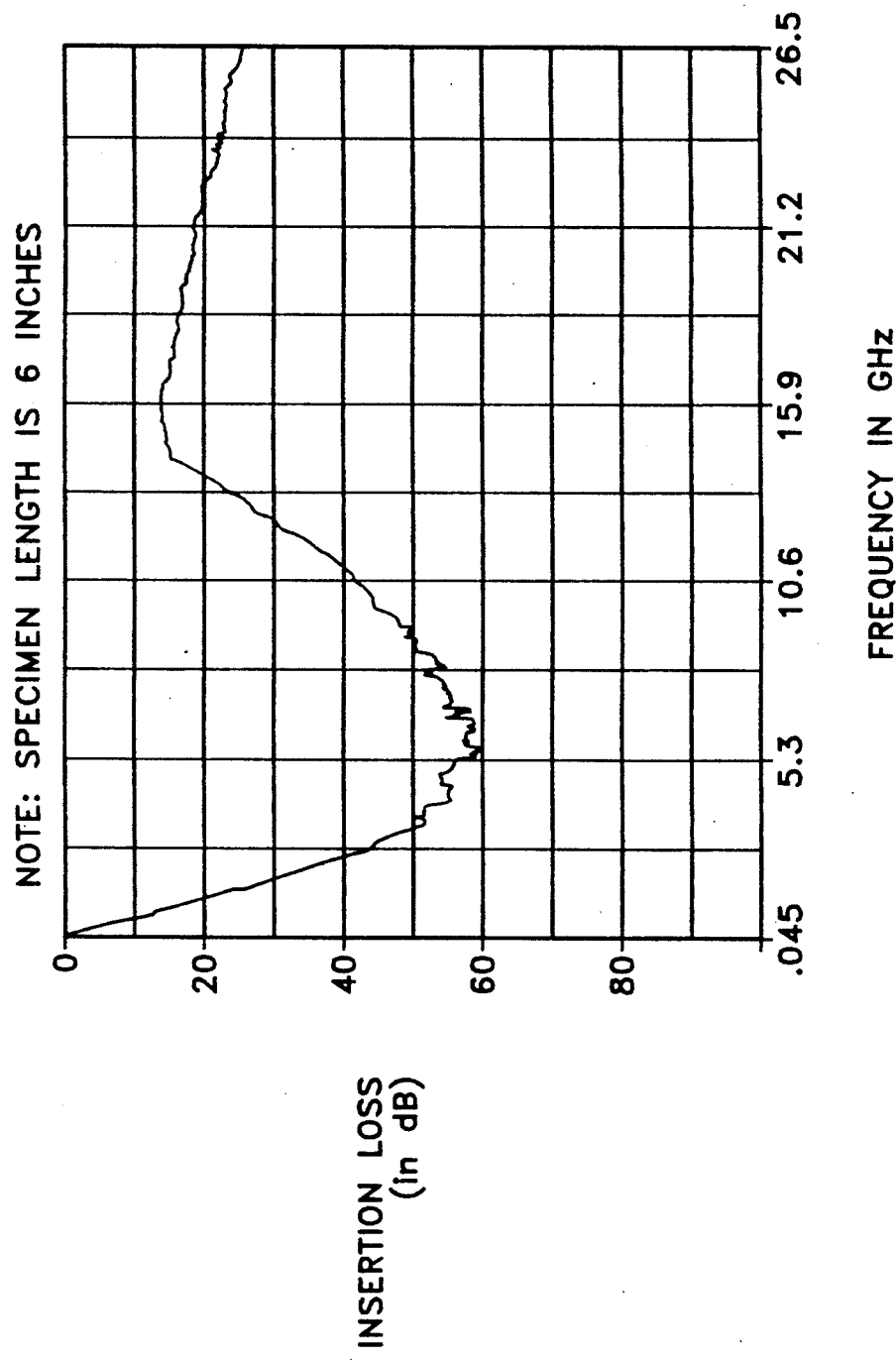

The attenuation results of this fabricated cable are shown in Table 1 below, and are illustrated in the graph of FIG. 2.

TABLE 1

| Frequency | Attenuation (dB/ft.) |
|---|---|
| 500 MHz | 16 |
| 1 GHz | 36 |
| 12 GHz | 59 |

EXAMPLE II

A cable was fabricated in accordance with the procedure described in Example I above, with the exception that the wall thickness of shield layer 14 was approximately 6 mils, and the ferrite particles were spherically shaped.

Figure 3A:
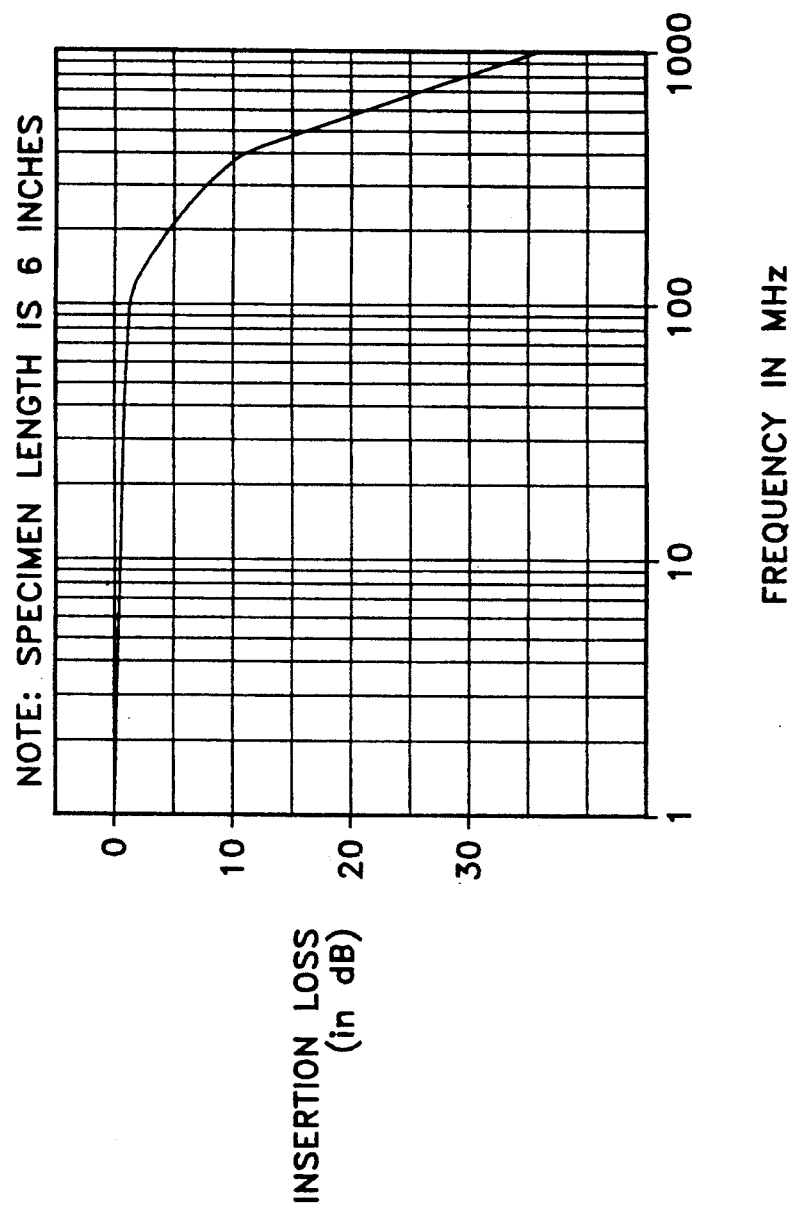
FIGS. 3a and 3b show graphs of attenuation test results utilizing a shaped ferrite particle shield layer in the shielded cable of this invention, using the cable constructed in accordance with FIG. 1.
Figure 3B:
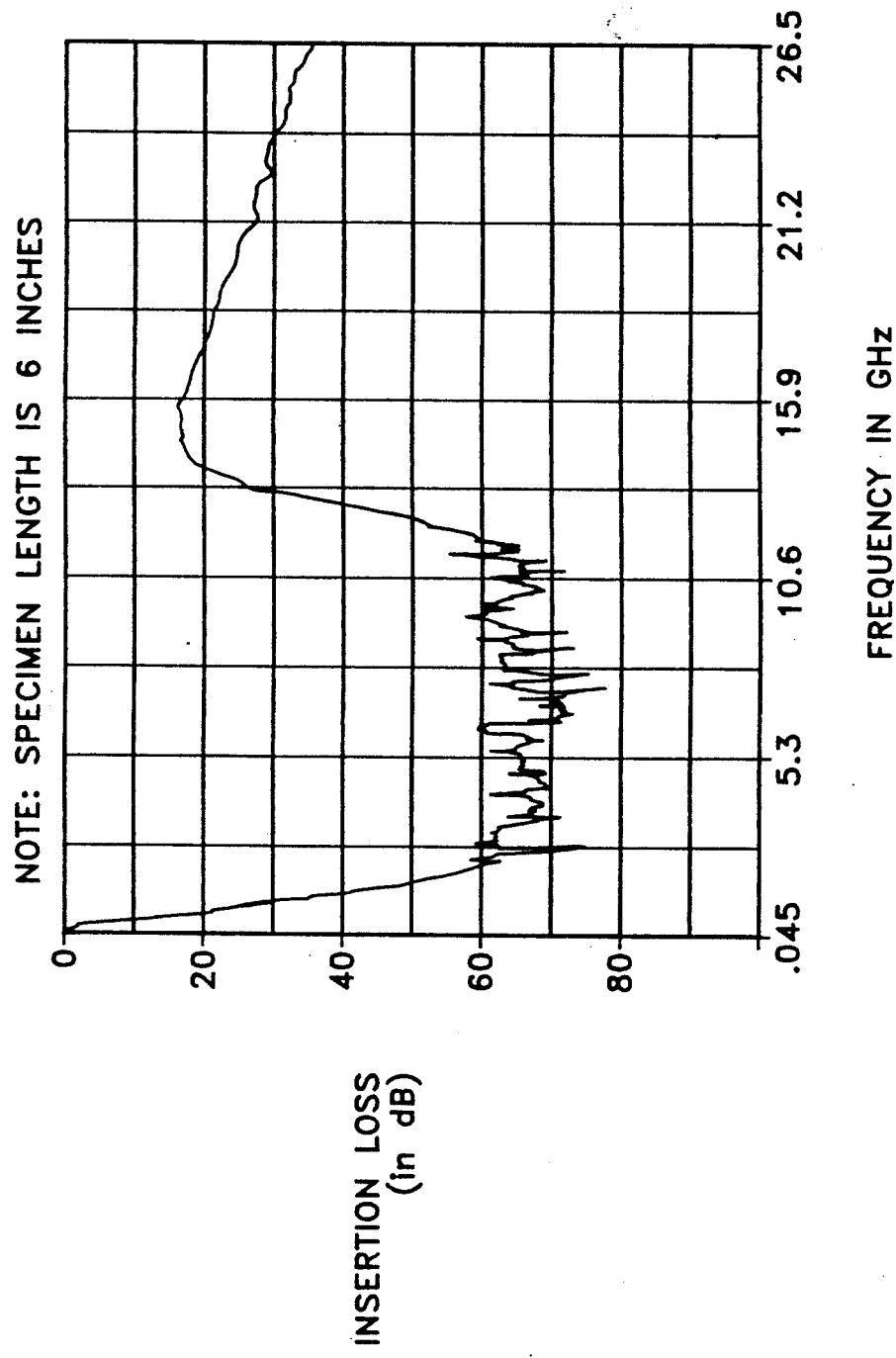

The attenuation results of this fabricated cable are shown in Table 2 below, and are illustrated in the graph of FIG. 3.

TABLE 2

| Frequency | Attenuation (dB/ft.) |
|---|---|
| 500 MHz | 30 |
| 1 GHz | 70 |
| 12 GHz | 100 |

EXAMPLE III

A cable was fabricated in accordance with the procedure described in Example I above, with the exception that the wall thickness of shield layer 14 was approximately 5.6 mils, and the MnZn ferrite particles comprised a blend of different shaped particles: spherical/irregular shaped flaked particles in a ratio of 25/75.

Figure 4A:
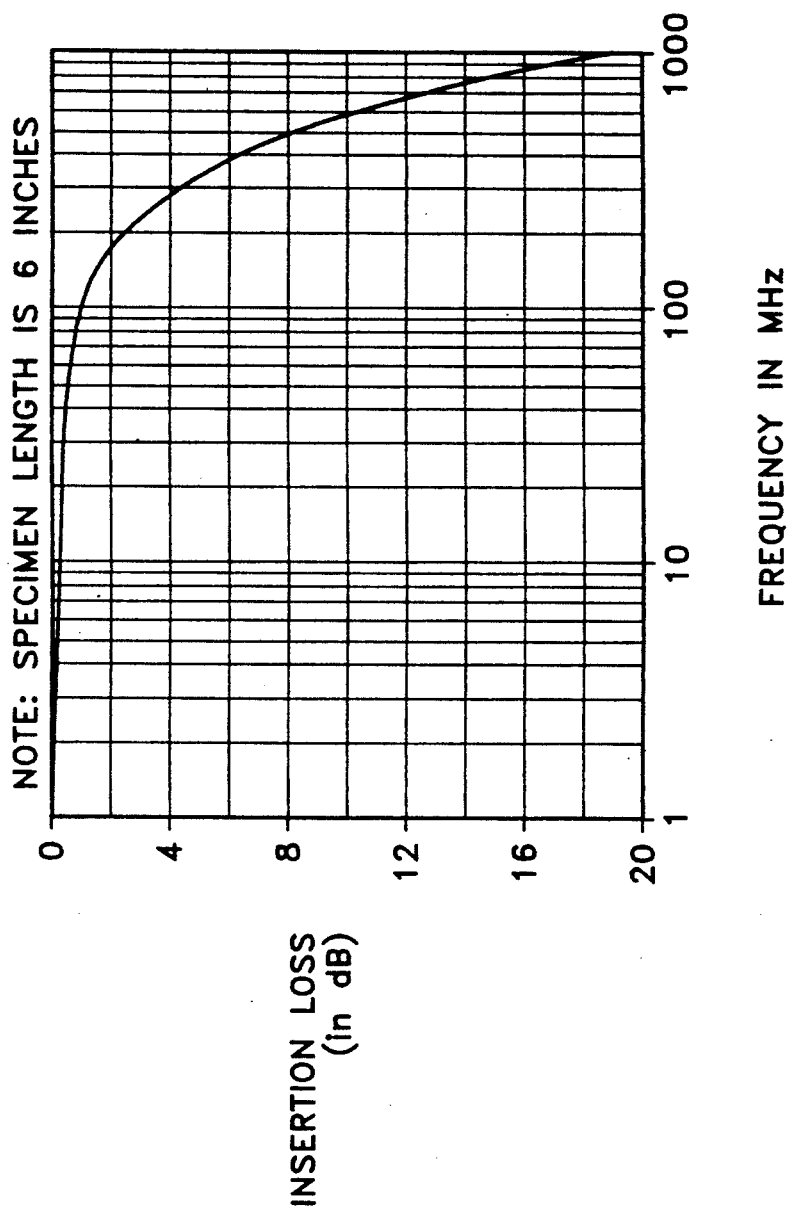
FIGS. 4a and 4b illustrate graphs of attenuation test results utilizing a 25/75 mixture of shaped and non-shaped ferrite particles in a shield layer utilizing the shielded cable construction shown in FIG. 1.
Figure 4B:
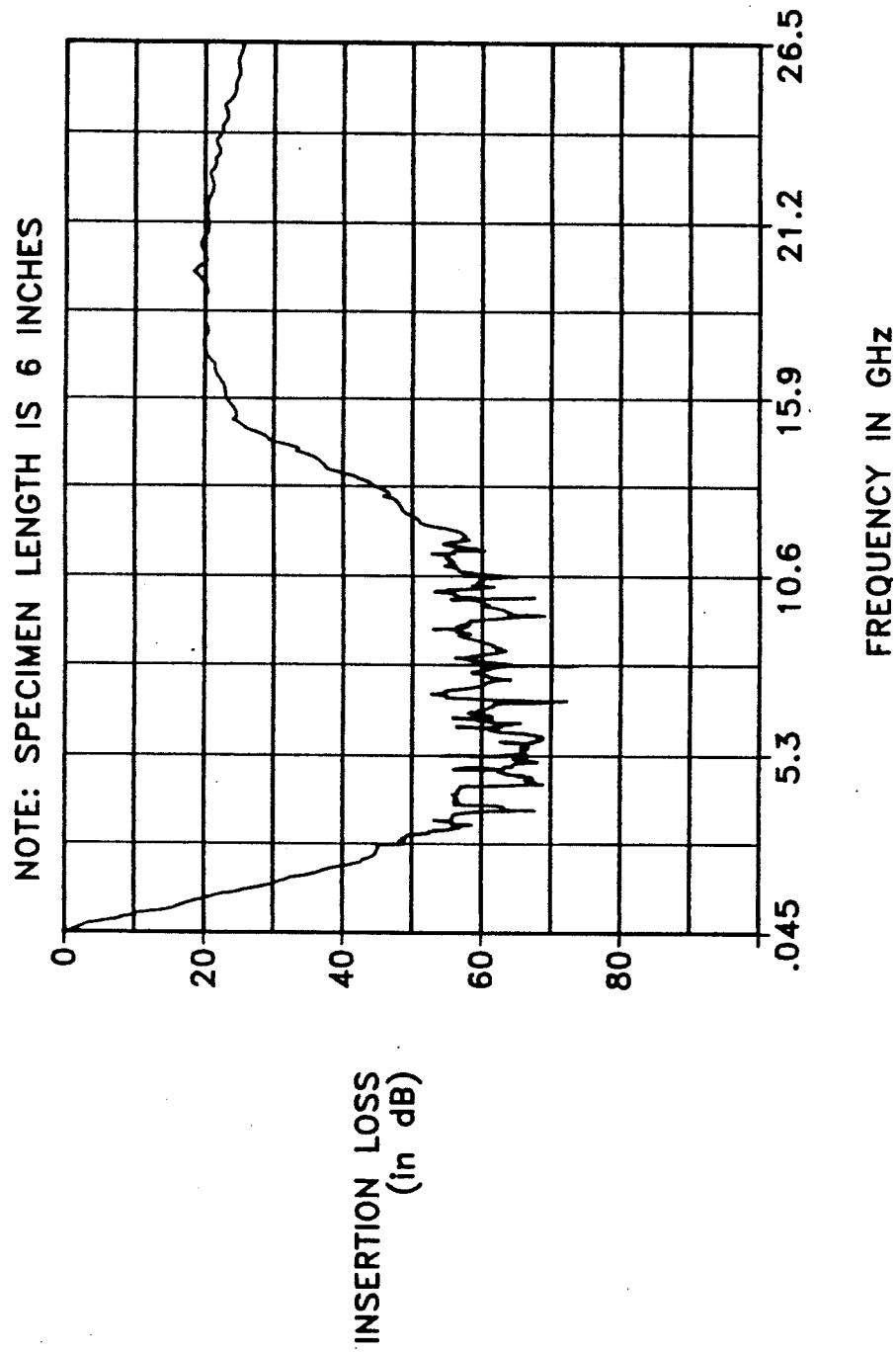

The attenuation results of this fabricated cable are shown in Table 3 below, and are illustrated in the graph of FIG. 4.

TABLE 3

| Frequency | Attenuation (dB/ft.) |
|---|---|
| 500 MHz | 16 |
| 1 GHz | 40 |
| 12 GHz | 100 |

EXAMPLE IV

A cable was fabricated in accordance with the procedure described in Example I above, with the exception that the wall thickness of shield layer 14 was approximately 3.3 mils, and the MnZn ferrite particles comprised a blend of different shape particles: spherical/irregular shaped flaked particles in a ratio of 50/50.

Figure 5A:
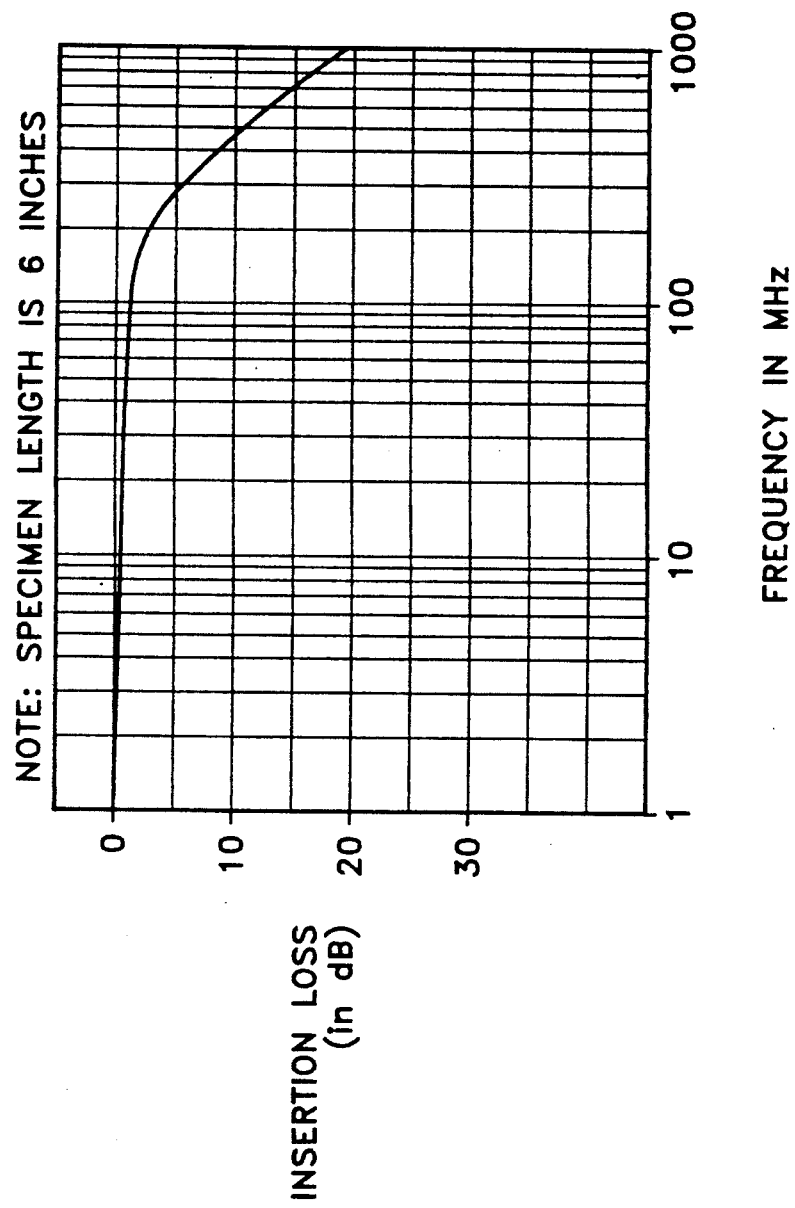
FIGS. 5a and 5b depicts graphs of attenuation test results utilizing a 50/50 mixture of shaped and non-shaped ferrite particles in a shield layer utilizing the shielded cable construction shown in FIG. 1.
Figure 5B:
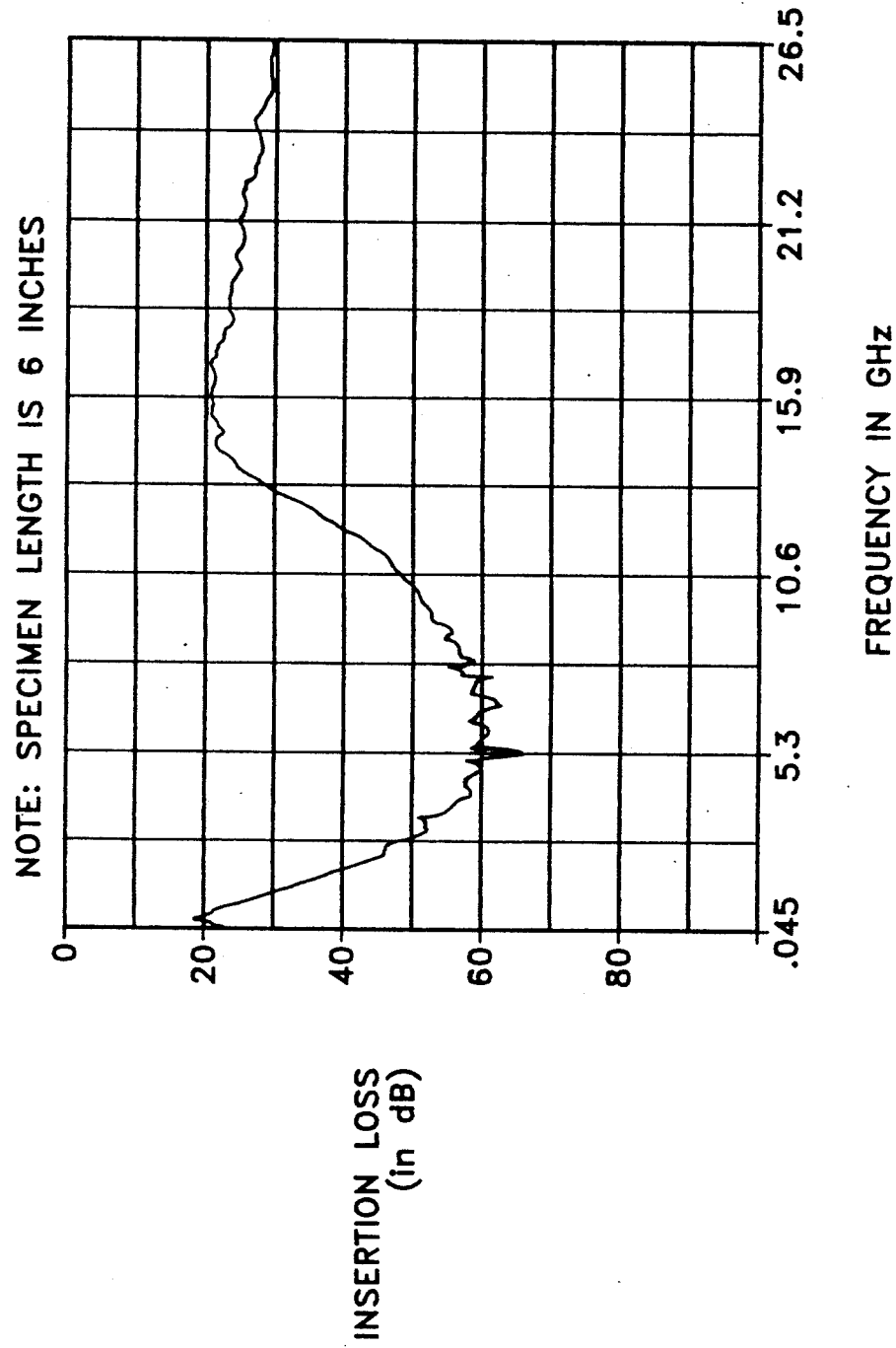

The attenuation results of this fabricated cable are shown in Table 4 below, and are illustrated in the graph of FIG. 5.

TABLE 4

| Frequency | Attenuation (dB/ft.) |
|---|---|
| 500 MHz | 17 |
| 1 GHz | 39 |
| 12 GHz | 71 |

From the above results, it is observed that the spherically shaped ferrite particles provide better attenuation than do standard, irregular shaped ferrite flakes.

Blends of the spherical/irregular shaped ferrite particles provided attenuation results between the two different shaped particles, as can be observed from the data.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described this invention, what is desired to be protected by LETTERS PATENT is presented by the subsequently appended claims.

What is claimed is:

1. A shielded wire or cable article wherein EMI shielding is provided in a polymer shielding layer, comprising:
    a) at least one conductive core member;
    b) an insulation layer disposed over said at least one conductive core member;
    c) a shielding layer overlaying said insulation layer and comprising geometrically round shaped ferrite particles, or combinations of geometrically round shaped and non-geometrically round shaped ferrite particles, dispersed within a polymer matrix; and
    d) a jacket layer disposed over said shielding layer.

2. The shielded wire or cable article in accordance with claim 1, wherein said shaped ferrite particles are spherical.

3. The shielded wire or cable article in accordance with claim 1, wherein said polymer matrix is selected from a group of polymer materials consisting of: fluorocarbons, acrylates, fluorinated elastomers, fluorinated copolymers, and combinations thereof.

4. The shielded wire or cable article in accordance with claim 1, wherein said polymer matrix comprises a material having approximately 10 to 90% by weight of the shielding layer.

5. A shielded wire or cable article having EMI shielding, comprising:
    a) a conductive core member;
    b) an insulation layer disposed over said conductive core member; and
    c) a shielding layer overlaying said insulation layer and comprising geometrically round shaped ferrite particles selected from a group of spherical and cylindrical and combinations thereof, said particles dispersed within a polymer matrix.

6. The shielded wire or cable article having EMI shielding in accordance with claim 5, further comprising:
    d) a jacket layer disposed over said shielding layer.

7. The shielded wire or cable article having EMI shielding in accordance with claim 6, wherein said ferrite particles are magnetite particles.

8. The shielded wire or cable article having EMI shielding in accordance with claim 5, wherein said polymer matrix is selected from a group of polymer materials consisting of: fluorocarbons, acrylates, fluorinated elastomers, fluorinated copolymers, and combinations thereof.

9. The shielded wire or cable article having EMI shielding in accordance with claim 5, wherein said polymer matrix comprises a material having approximately 10 to 90% by weight of the shielding layer 10. A shielded cable article having EMI shielding, comprising:
    a) at least two conductive core members, each of said respective core members having an insulation layer disposed thereover to form a respective insulated core member, said insulated core members being grouped or twisted together; and
    b) a shielding layer overlaying said grouped or twisted insulated core members, said shielding layer comprising geometrically round shaped and non-geometrically round shaped ferrite particles, said geometrically round shaped and non-geometrically round shaped particles dispersed within a polymer matrix.

11. The shielded cable article having EMI shielding in accordance with claim 10, further comprising:
    c) a jacket layer disposed over said shielding layer.

* * * * *